United States Patent [19]
Kleewein et al.

[11] Patent Number: 5,943,666
[45] Date of Patent: Aug. 24, 1999

[54] METHOD AND APPARATUS FOR OPTIMIZING QUERIES ACROSS HETEROGENEOUS DATABASES

[75] Inventors: James Charles Kleewein; Eileen Tien Lin; Tina Louise Mukai; Shivakumar Venkataraman, all of San Jose, Calif.

[73] Assignee: International Business Machines Corporation, Armonk, N.Y.

[21] Appl. No.: 08/929,877

[22] Filed: Sep. 15, 1997

[51] Int. Cl.$^6$ ........................................... G06F 17/30
[52] U.S. Cl. ........................................ 707/2; 707/3; 707/4
[58] Field of Search ................................ 707/2, 3, 10, 4

[56] References Cited

U.S. PATENT DOCUMENTS

| | | | |
|---|---|---|---|
| 5,091,852 | 2/1992 | Tsuchida et al. | 707/2 |
| 5,301,317 | 4/1994 | Lohman et al. | 707/2 |
| 5,412,806 | 5/1995 | Du et al. | 707/2 |
| 5,544,355 | 8/1996 | Chaudhuri et al. | 707/2 |
| 5,546,576 | 8/1996 | Cochrane et al. | 707/2 |
| 5,574,900 | 11/1996 | Huang et al. | 707/2 |
| 5,590,321 | 12/1996 | Lin et al. | 707/10 |
| 5,596,764 | 1/1997 | Intrater et al. | 395/800 |
| 5,600,831 | 2/1997 | Levy et al. | 707/2 |
| 5,608,904 | 3/1997 | Chaudhuri et al. | 707/2 |
| 5,727,196 | 3/1998 | Strauss, Jr. et al. | 707/2 |
| 5,758,149 | 5/1998 | Bierma et al. | 707/8 |
| 5,758,335 | 5/1998 | Gray | 707/2 |
| 5,761,653 | 6/1998 | Schifer et al. | 707/2 |

FOREIGN PATENT DOCUMENTS

0625756 A1  11/1994  European Pat. Off. ........... 15/40

OTHER PUBLICATIONS

IBM Technical Disclosure Bulletin, vol. 31, No. 5, Oct. 1988, pp. 301–303, "Interpretive Database Merge Join Operation".

Internet Paper http://www.isgsoft.com/products/Navigator/nav–whp. asp, Feb. 1997, pp. 1–25, "ISG Navigator White Paper".

CIKM 93, Nov. 1–5, 1993, pp. 423–432, Chun–Nan Hsu et al., "Reformulating Query Plans for Multidatabase Systems".

CIKM 93, Nov. 1–5, 1993, pp. 433–438, Ahmet Cosar et al., "Multiple Query Optimization with Depth–First Branch–and–Bound and Dynamic Query Ordering".

Optimizing Queries Across Diverse Data Sources, (IBM) Feb. 21, 1997, pp. 1–25, Laura M. Haas et al.

Proceedings–Third International Conference on Parallel and Distributed Information Systems, Sep. 28–30, 1994, p. 264, Piyush Gupta et al., "DataJoiner: A Practical Approach to Multi–Database Access".

Readings on Database Systems, Second Edition, 1994, pp. 84–95, Ed.: M. Stonebraker, Ruth Morgan–Kaufman.

*Primary Examiner*—Thomas G. Black
*Assistant Examiner*—Frantz Coby
*Attorney, Agent, or Firm*—Ohlandt, Greeley, Ruggiero & Perle

[57] ABSTRACT

A heterogeneous database system includes plural databases, one database acting as a system manager which performs functions to provide a transparent user interface that encompasses both the system manager database and other databases. The system manager includes a memory which stores (i) a database management procedure, (ii) a catalog of database functions that are supported by the plural databases, and (iii) a query optimizer procedure. A processor is responsive to a user query which requires data stored at a remote database, to execute the query optimizer procedure. The query optimizer procedure employs entries from the catalogue relating to database functions supported by both the system manager database and the remote database and establishes query plans for responding to the query. A first query plan is based upon execution at the remote database and a second query plan is based upon execution at the system manager database. The query optimizer then chooses one of the query plans in accordance with a determined criteria and causes the selected plan to be executed.

18 Claims, 3 Drawing Sheets

24

30 — DBMS PROCEDURE
32 — LOCAL DATABASE CONTROL PROCEDURE
34 — REMOTE DATABASE CONTROL PROCEDURE
36 — QUERY OPTIMIZER PROCEDURE

38 — CATALOGUE

40 {
LOCAL (DB2) SUPPORTED PROCEDURES
ACCESS METHODS
JOIN METHODS
AGGREGATE FUNCTIONS
SEARCH ALGORITHMS USED
}

42 {
REMOTE (ORACLE) SUPPORTED PROCEDURES
ACCESS METHODS
JOIN METHODS
AGGREGATE FUNCTIONS
SEARCH ALGORITHMS USED
}

44 {
REMOTE (SYBASE) SUPPORTED PROCEDURES
ACCESS METHODS
.
.
.
}

46 {
ACCESS PROCEDURES
JOIN PROCEDURES
AGGREGATE FUNCTIONS
SEARCH ALGORITHMS
}

FIG.2

METHOD AND APPARATUS FOR OPTIMIZING QUERIES ACROSS HETEROGENEOUS DATABASES

CROSS-REFERENCE TO RELATED PATENT APPLICATIONS

This Application is related to the following co-pending patent applications:

"HETEROGENEOUS DATABASE SYSTEM WITH DATA SOURCE EXTENSIBILITY", Inventor(s): Kleewein et al., U.S. Ser. No. 08/929,809;

"SYSTEM AND METHOD FOR PROVIDING A SINGLE APPLICATION PROGRAM INTERFACE FOR HETEROGENEOUS DATABASES", Inventor(s): Kleewein et al., U.S. Ser. No. 08/931,008;

"METHOD AND APPARATUS FOR OPTIMIZING A MERGE-JOIN OPERATION ACROSS HETEROGENEOUS DATABASES", Inventor(s): Kleewein et al., U.S. Ser. No. 08/931,404;

"METHOD AND APPARATUS FOR CACHING RESULT SETS FROM QUERIES TO A REMOTE DATABASE IN A HETEROGENEOUS DATABASE SYSTEM", Inventor(s): Kleewein et al., U.S. Ser. No. 08/931,003;

"METHOD AND APPARATUS FOR DEFERRING LARGE OBJECT RETRIEVALS FROM A REMOTE DATABASE IN A HETEROGENEOUS DATABASE SYSTEM", Inventor(s): Kleewein et al., U.S. Ser. No. 08/929,642;

"HETEROGENEOUS DATABASE SYSTEM WITH DYNAMIC COMMIT PROCEDURE CONTROL", Inventor(s): Kleewein et al., U.S. Ser. No. 08/931,029; and "METHOD AND APPARATUS FOR ACCESSING OF LARGE OBJECT DATA SEGMENTS FROM A REMOTE DATABASE", Inventor(s): Maheshwari et al., U.S. Ser. No. 08/931,002.

FIELD OF THE INVENTION

This invention relates to an application program interface which provides transparent access to heterogeneous databases and, more particularly, to an interface which provides an optimized query plan, based upon emulated optimization procedures supported by heterogeneous database systems.

BACKGROUND OF THE INVENTION

A continuing demand exists to join multiple databases so as to enable transparent access to data stored therein. "Transparent" implies that an application program at a specific site is able to access data from all connected databases, without being aware of the origin of the data, nor of any incompatibilities which might exist between a local database and any of the plurality of coupled remote databases. It is to be understood that the terms "remote" and "local" not only refer to physical locations, but also to databases that are located at a single site, but are controlled by different operating systems or database protocols.

In order to provide a transparent interface for heterogeneous databases, the prior art has employed one database as an interface and has enabled that interface, under control of a database management system (DBMS), to access data from other databases in accordance with data entries contained in an interface table. Upon receiving a query, the receiving DBMS performs various query optimization procedures to provide an efficient method for accessing the requested data. However, in a heterogeneous database system, query planning, optimization and processing capabilities of the various database systems differ greatly. Even in the case where plural database systems are capable of executing an identical query statement (such as might be put forth using SQL, a commonly utilized database query language), the query plans produced in response to the query statement at each database may be vastly different. This can occur because each database system utilizes different access methods, join methods and/or aggregate functions in the performance of their database actions. Thus, if a query optimizer in a heterogeneous database system produces a query plan which assumes that all database systems produce similar query plans, a significantly sub-optimal query plan will be produced.

The prior art has suggested a number of methods of optimizing queries across heterogeneous databases. Haas et al. in "Optimizing Queries Across Diverse Datasources", international Conference on Veryn Large Databases, February, 1997, focus on integrating plural database systems. Haas et al. employ a query optimizer which uses information about the processing power of the remote database systems to optimize queries. Their query optimizer does not take into account the planning abilities of the remote database systems to produce a global plan. Neither do they consider search algorithm differences nor the access method to be used by the remote optimization systems.

Shu et al. in "Reformulating Query Plans for Multidatabase Systems", Proceedings of the Second International Conference on Information and Knowledge Management, Nov. 1–5, 1993, pages 423–432 describe a process for reformulating query plans to improve the efficiency of multidatabase queries. The Shu et al. approach uses database abstractions and knowledge concerning the contents of the heterogeneous databases to formulate a query plan. The Shu et al. system does not take into account optimization capabilities of the remote databases.

Kosar et al in "Multiplea Query Optimization with Depth-first Branch-and-Bound and Dynamic Query Ordering," Proceedings of the Second International Conference on Information and Knowledge Management, Nov. 1–5, 1993, pages 433–438, describe a query optimization procedure wherein groups of related queries are executed together in a single multi-plan instead of being executed separately. The Kosar et al procedure employs dynamic query ordering heuristics and other protocols to provide query optimization.

U.S. Pat. No. 5,600,831 to Levy et al describes techniques for optimizing queries in a heterogeneous database system. A query results in a query plan which includes subplans for querying the databases which contain the required information. When a subplan is executed in one of the databases, the database returns not only the information which results from the execution of the subplan, but also source and constraint information about the data in the database. The source and constraint information is then used to optimize the query plan by pruning redundant subplans.

U.S. Pat. No. 5,301,317 to Lohman et al. adapts a query optimization effort to expected execution time. Lohman et al. include a mechanism for automatically trading off the time spent estimating execution cost of alternate query execution plans against the potential savings in execution time that one of the alternative plans may yield.

Lin et al. in U.S. Pat. No. 5,590,321 describe a query optimization plan for a heterogeneous database system which uses an interface module that has information concerning the data stored in, and the capabilities of each of a plurality of databases in the heterogeneous system. The interface module determines whether a query or subquery satisfies several criteria, i.e., whether a single database within the heterogeneous system contains all of the data referenced in the query or subquery and whether the same database provides all of the functions or capabilities needed to satisfy the query or subquery. If these criteria are met, the query or subquery can be pushed down to the single database to there be executed.

A number of prior art references consider various methods for query optimization in relational database systems. Such references include Selinger et al. "Access Path Selection in a Relational Database Management System", Chapter 2. Relational Implementation Techniques, Readings on Database Systems, 2nd Ed., M. Stonebraker, Editor, Morgan-Kaufmann (1994); U.S. Pat. No. 5,598,559 to Chaudhuri; U.S. Pat. No. 5,544,355 to Chaudhuri et al.; and U.S. Pat. No. 5,546,576 to Cochrane et al. None of the aforementioned references consider query optimization in heterogeneous database systems nor, more particularly, the use of optimization processes carried out by remote databases in heterogenous systems.

Accordingly, it is an object of this invention to provide an improved method and apparatus for query optimization in a heterogeneous database system, wherein query planning functions of remoter databases are taken into account.

It is another object of this invention to provide an improved query optimization procedure for a heterogeneous database system which takes into account functions supported by remote databases in order to select an optimum query plan.

It is a further object of this invention to provide an improved method and apparatus for query optimization in a heterogeneous database system wherein one database is used as a transparent interface to an application program

SUMMARY OF THE INVENTION

A heterogeneous database system includes plural databases, one database acting as a system manager which performs functions to provide a transparent user interface that encompasses both the system manager database and other databases. The system manager includes a memory which stores (i) a database management procedure, (ii) a catalog of database functions that are supported by the plural databases, and (iii) a query optimizer procedure. A processor is responsive to a user query which requires data stored at another database, to execute the query optimizer procedure. The query optimizer procedure employs entries from the catalogue relating to database functions supported by both the system manager and the remote database and establishes query plans for responding to the query. A first query plan is based upon execution at the remote database and a second query plan is based upon execution at the system manager. The query optimizer then chooses one of the query plans in accordance with a determined criteria and causes the selected plan to be executed.

BRIEF DESCRIPTION OF THE DRAWINGS

FIG. 2 is a schematic diagram of data contained within memory in the system of FIG. 1 which enables operation of the invention.

DETAILED DESCRIPTION OF THE INVENTION

Figure 1:
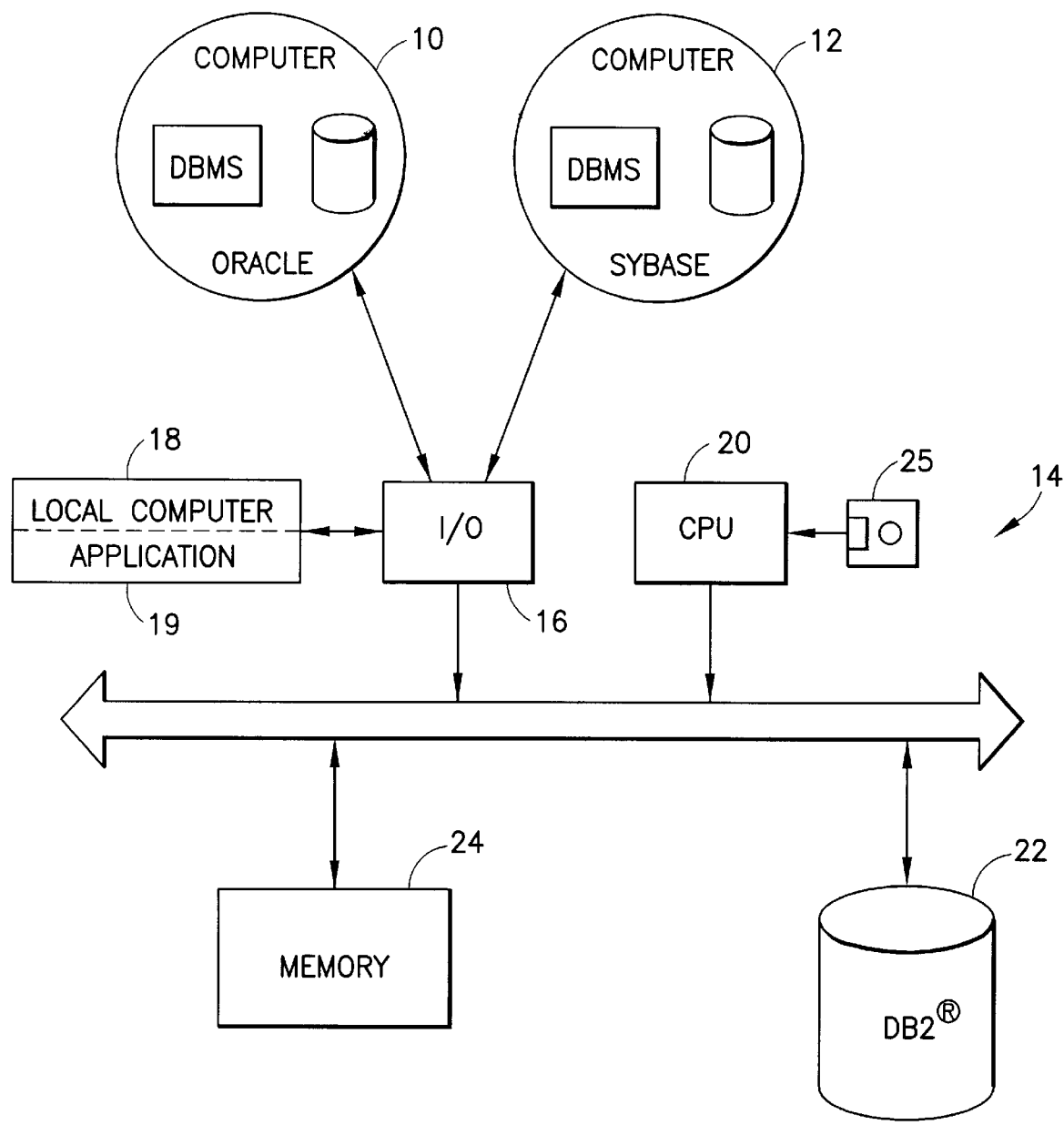
FIG. 1 is a high-level block diagram of a heterogeneous database system which incorporates the invention.

Referring to FIG. 1, a heterogeneous database system includes, for example, three separate database management systems (DBMS's). A computer 10 includes an Oracle DBMS, a computer 12 includes a Sybase DBMS, and a computer/server 14 includes an IBM DB2 DBMS (Oracle is a trademark of the Oracle Corporation, Sybase is a trademark of the Sybase Corporation, and IBM and DB2 are regisytered trademarks of the International Business Machines Corporation). Computer/server 14 includes an input/output (I/O) module 16 which enables communication with computers 10 and 12 and various local computers 18, etc.

As will be hereafter understood, an application program 19 running on local computer 18 is able to access data from any connected database, whether the data is housed in computers 10, 12 or 14, and at all times it appears to application program 19 as though the data is coming from computer/server 14. A central processing unit (CPU) 20, a disk file 22 where the data comprising the DB2 database is stored and a memory 24 are all contained within computer/server 14. Within memory 24 are a plurality of procedures which provide overall control of the DB2 database and enable transparent access to and from the Oracle and Sybase databases in computers 10 and 12.

Each of the aforesaid databases can be accessed by a standard data access language such as SQL (structured query language) SQL functions as a standard interface language which substantially all databases can understand and respond to.

While the procedures to be considered below which enable implementation of the invention are shown in FIG. 2 as already loaded into memory 24, it is to be understood those procedures can be loaded into CPU 20 via a memory disk, tape or other storage device 25 in the well known manner. In any of these cases, the operation of CPU 20, in carrying out the functions of the invention, are controlled by the procedures and data stored in either memory 24 or storage device 25

FIG. 2 is a diagram which schematically illustrates some of the entries stored in memory 24 of FIG. 1. DBMS procedure 30 includes local database control procedure 32 and remote database control procedure 34. Local database control procedure 32 is, for instance, responsive to a request from application program 19 running on local computer 18, to retrieve requested data from the DB2 database stored on disk file 22. Remote database control procedure 34 performs the same function, but with respect to the Oracle and Sybase databases contained within computers 10 and 12, respectively. In all cases, the functioning of procedures 32 and 34 are transparent to application program 19.

Upon receiving a query from application 19, DBMS procedure 30 invokes query optimizer procedure 36 which, in turn, determines an optimum method for responding to the query from application 19. As will be understood from the description below, query optimizer procedure 36, in response to a query which requires access to one or more remote database(s), emulates the optimization procedure carried out by the remote database(s) in an attempt to arrive at an optimum data access procedure. To enable such emulation, a catalogue 38 is present in memory 24 and stores lists of methods that are supported by each connected database, whether local or remote. DB2 supported procedures listing 40 lists access methods, join methods, aggregate functions, and search algorithms used by the DB2 database. In a similar fashion, Oracle supported procedure listing 42 and Sybase supported procedure 44 include similar listings, but for their respective databases. Catalog 38 also includes a section of memory 46 devoted to storage of the procedures, per se, which are used to accomplish various access, join, aggregation and search methods.

While a detailed knowledge of database-related procedures, such as access methods, join methods, aggregate functions and search algorithms, is not required for an understanding of this invention, descriptions thereof can be found in "Database Systems", C. J. Date, Volume I, Fifth Edition, Addison-Wesley Systems Programming Series (1991).

Through use of catalogue 38 and its various entries, query optimizer procedure 36 is able to emulate the query optimization procedure carried out at each database, from which data will be accessed, and to then render a cost-based decision which selects an optimum search plan to thereafter be carried out. More specifically, query optimizer procedure 36 determines (i) whether it is more cost effective to import tables containing data required to respond to a query from the remote databases and perform a search plan at the local database or (ii) whether it is more cost effective to execute the search plan, as determined by a remote database optimization procedure, at the remote database and then to import the results.

If query optimizer procedure 36 does not consider the optimization procedures carried out at remote databases, substantially degraded search plans will result. This is because, during execution, portions of a global query plan to be executed at a remote database are converted back into SQL statements and are sent to the remote database system. There, the received SQL statements are subjected to an optimization procedure to provide a subplan which is then executed. If the subplan produced at the remote database system for a received SQL statement is substantially different from the global plan from which the SQL statement is generated, query processing performance for the global query will be less than optimum.

For example, some database systems may only support nested loop joins, while others support both nested loop joins and merge joins If query optimizing procedure 38 produces a global search plan assuming all databases support nested loop and merge joins, the global plan produced will not reflect the actual execution plan. Further, access methods supported by various databases can be different. Some databases may support only table scans, while others may have index and table scans and others may have table, index and index or scans. Accordingly, to assure an optimum global query plan, this invention takes into account not only the specific functionalities that are available at the remote (and local) databases, but also the optimizing procedures used thereat.

In order to achieve an emulation of a remote database's optimization actions, the entries in catalogue 38 (which for databases produced by vendors other than the vendor of the Local database, are determined from published information produced by the vendors), are used to achieve the optimization emulation action. For example, if a join can be pushed down for execution to a remote database, query optimization procedure 36 only considers the join methods supported by that remote database system and determines a cost for the join action, based on those methods.

Figure 3:
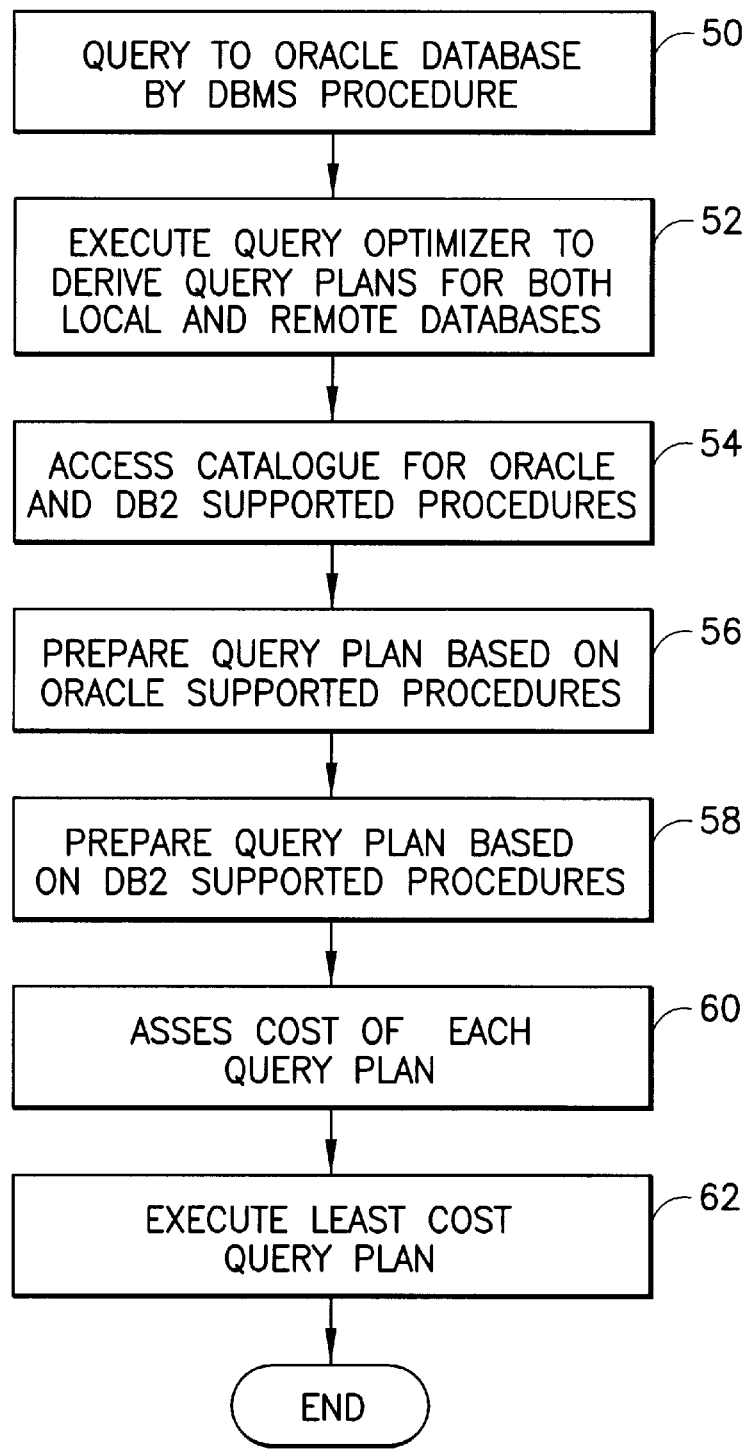
FIG. 3 is a logical flow diagram which illustrates operation of the method of the invention.

FIG. 3 provides a high level flow diagram which describes the overall procedure of the invention. Subsequent to a consideration of FIG. 3, a detailed example will be given which further illustrates the operation of the invention. Box 50 in FIG. 3 assumes that a query to an Oracle database is received by DBMS procedure 30. In response, DBMS procedure 30 invokes query optimizer procedure 36 to derive a global query plan (box 52). That global query plan includes at least a pair of subplans, one which considers execution of the functions required to respond to the query on the requested local database and one which executes the required functions at the remote (Oracle) database.

Next, query optimizer procedure 36 accesses data from catalog 38 for both the Oracle and DB2 supported procedures (box 54). A query subplan based on the Oracle supported procedures (box 56) is then prepared and a query subplan based upon DB2 supported procedures (box 58) is also prepared. Thereafter, the cost of each query subplan is assessed (box 60) and the least costly query plan (box 62) is executed.

The cost determination may include a consideration of one or more of the following elements: number of machine cycles requires to perform the function(s); number of memory I/O's; communication costs (time required to transmit data over a network), etc. For instance, consider a query which requires a join action. As known to those skilled in the art, join actions require that data from several sources be joined in accordance with a specified criteria. Thus, a query may request the names of all employees in a certain department whose salaries exceed a certain value. To return the requested data, requires that one table listing names of employees in a department be joined with a table which provides the salaries of all employees. Assuming that all of the requested data resides in tables at a remote database, query optimizer procedure 36 first assesses the cost of performing the join action at the remote database, using an emulation of the optimization procedure which resides at the remote database. Then, query optimizer procedure 36 assumes that the tables containing the necessary data are imported into the local database (i.e., DB2) and that the required join action is carried out at the local database, using a join procedure supported thereat. The ultimate output of query optimizer procedure 36 is an indication of where the database actions required to respond to a query can be most efficiently handled.

During the following example, certain terms will be used which are defined below Each database generally uses a search algorithm to access data from its tables. Such search algorithms may, for example, be "left deep" and/or "bushy". In order to understand the techniques used by such search algorithms, certain terms are hereafter used:

outer table
    the table from which a search name is retrieved
inner table
    the table from which data is retrieved, based on the search name retrieved from the outer table
left deep search algorithm
    more than one outer table is required and only one table is utilized as the inner table
bushy search algorithm
    a search procedure in which there can be more than one inner table from which data is to be accessed in response to a search name from an outer table The following is an example of a query which selects an employee name, the employee's department name, for any employee who works in a department that has a project, the budget for which is less than the department's budget.

The following are definitions of terms used in the Queries:
    EMP, DEPT, PROJ, PDEP→names of tables at Oracle database 10.

EMP(EMPNO, EMP_NAME, DEPNO)→table of
  employees and their departments.
DEPT(DEPNO, DEP_NAME, BUDGET)→department
  table and budget.
PDEP(DEPNO, PNO)→projects and the Dept the
  projects correspond to.
PROJ(PNO, BUDGET)→protect table (list of projects).
NLJN→nested loop join.
MGJN→merge join.
Step 1
  The following query is submitted to DBMS procedure 30:
  SELECT EMP_NAME, DEPT NAME,
  FROM EMP, DEPT, PROJ, PDEP
  WHERE EMP.DEPNO=DEPT.DEPNO
    AND DEPT.DEPNO=PDEP.DEPNO
    AND PDEP.PNO=PROJ.PNO
    AND DEPT.BUDGET>PROJ.BUDGET
Step 2
  The query is fed to query optimizer procedure 36:
Step 3
  Query optimizer procedure 36 looks up catalog 38 and determines that the Oracle database uses a search algorithm that looks at a part of the search base (i.e., left deep search). It also finds that the Oracle database considers nested loop joins, merge-joins and hash joins (from catalogue 38). This information is used to generate a subplar for responding to the query at the Oracle database 10.
Step 4
  Query optimizer procedure 36 then produces several plans, based on the capabilities of the Oracle optimizer and picks an optimal plan. The following plans are prepared:

PLAN I

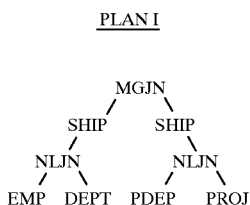

Plan I (read from bottom to top) states that the EMP and DEPT tables are to be joined first (within the Oracle database) and the result is then to be shipped back to DBMS procedure 30. The PDEP and PROJ tables are also to be joined on Oracle and the result shipped to DBMS procedure 30. To execute the above plan, two queries are required to be sent to the Oracle database 10.

PLAN II

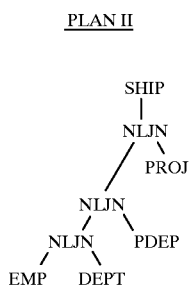

Plan II requires that the EMP and DEPT tables be joined first on Oracle database 10, using a nested loop join procedure. The result of the join action is then joined with the PDEP table and the result is further joined with the PROJ table. The result is then shipped from the Oracle database 10 to DBMS procedure 30.

Query optimizer procedure 36 eliminates any subplan which cannot be executed by the Oracle database. For instance, if the Oracle optimizer does not allow a bushy tree search (i.e., more than one inner table) then query optimizer procedure 36 does not consider such a plan. Further, if, for instance, a merge-join operation is required but is not supported Oracle database 10, again, query optimizer procedure 36 does not produce a plan incorporating such a merge-join action.

Once the subplans (i.e., Plans I and II) are developed, the plan with lowest cost is chosen from among the subplans. Lowest cost is generally the plan that is estimated to run the fastest, wherever it is executed.

It should be understood that the foregoing description is only illustrative of the invention. Various alternatives and modifications can be devised by those skilled in the art without departing from the invention. For example, it has been assumed above that the query plan is either to be executed at the local database or a remote database. It is also within the scope of this invention to make a choice between query plans to be executed on one of several remote databases. Accordingly, the present invention is intended to embrace all such alternatives, modifications and variances which fall within the scope of the appended claims.

We claim:

1. A heterogeneous database system including plural databases, one database acting as a system manager (hereafter "system manager") which performs functions to provide a transparent user database encompassing both said one database and other databases, said system manager comprising:
  a memory for storing (i) a database management procedure, (ii) a catalogue of database functions that are supported by said plural databases, including but not limited to join methods, aggregate functions and search algorithms, and (iii) a query optimizer procedure; and
  a processor coupled to said memory and responsive to a user query which requires execution of a database function with respect to data stored at a first database, for executing said query optimizer procedure, said processor, under control of said query optimizer procedure, employing entries from said catalogue relating to database functions supported by both said first database and a second database, to establish query plans for responding to said query, a first said query plan based upon an optimized execution thereof at said first database and a second said query plan based upon an optimized execution thereof at said second database, and for choosing one of said query plans in accordance with a determined criteria, to be executed by said database management procedure in response to said user query.

2. The heterogeneous database system as recited in claim 1, wherein said processor, under control of said query optimizer procedure, employs entries from said catalogue relating to functions supported by said first database, to emulate a query optimization procedure for said first database, approximately as said query optimization procedure is executed by said first database.

3. The heterogeneous database system as recited in claim 1, wherein said determined criteria for choosing one of said query plans is an execution cost thereof.

4. The heterogeneous database system as recited in claim 1, wherein said catalogue includes, for each database type, entries which define supported functions, said supported functions at least including: a search algorithm or algorithms used in said database type; a data access method or methods used in said database type; and join methods used by said database type.

5. The heterogeneous database system as recited in claim 1, wherein said second database is the database that acts as said system manager.

6. The heterogeneous database system as recited in claim 5, wherein said processor employs one of said query plans, chosen in accord with said determined criteria, to access data from one of said plural databases and to present said data to a user processor as though said data had come from the database that acts as said system manager, whether or not said data came therefrom or from said first database.

7. The heterogeneous database system as recited in claim 1, wherein said first database is remotely positioned from said system manager.

8. A memory media including software procedures to provide transparent access to plural heterogeneous databases, one of said databases acting as a system manager (hereafter "system manager") which performs functions of a transparent user database encompassing both said one of said databases and other databases, said memory media comprising:

a) means for causing said system manager to store (i) a database management procedure, (ii) a catalogue of database functions that are supported by said plural databases, including but not limited to join methods, aggregate functions and search algorithms, and (iii) a query optimizer procedure; and b) means for controlling a processor in said system manager to be responsive to a user query which requires execution of a database function with respect to data stored at a first database, to execute said query optimizer procedure, said query optimizer procedure employing entries from said catalogue relating to database functions supported by both said system manager and said first database, by establishing query plans for responding to said query, a first said query plan based upon an optimized execution thereof at said first database and a second said query plan based upon an optimized execution thereof at said system manager, and for choosing one of said query plans in accordance with a determined criteria, to be executed by said database management procedure in response to said user query.

9. The memory media as recited in claim 8, wherein said means b) causes said processor to employ entries from said catalogue relating to functions supported by said first database, to emulate a query optimization procedure for said first database approximately as said query optimization procedure is executed by said first database.

10. The memory media as recited in claim 8, wherein said means b) causes said processor to utilize execution cost as said determined criteria for choosing one of said query plans.

11. The memory media as recited in claim 8, wherein the catalogue of means a) includes, for each database type, entries which define supported functions, said supported functions including: a search algorithm or algorithms used in said database type; a data access method or methods used in said database type; and join methods used by said database type.

12. The memory media as recited in claim 8, wherein said means b) causes said processor to employ one of said query plans, chosen in accord with said determined criteria, to access data from one of said plural databases and to present said data to a user processor as though said data had come from said system manager database, whether or not said data came from said system manager database or said first database.

13. The memory media as recited in claim 8, wherein said first database is remotely positioned from said system manager.

14. A method for choosing an optimized query plan for accessing data in a heterogeneous database system, one database acting as a system manager (hereafter "system manager") which performs functions of a transparent user database, said method implemented by said system manager and comprising the steps of:

a) storing (i) a database management procedure, (ii) a catalogue of database functions that are supported by said plural databases, including but not limited to join methods, aggregate functions and search algorithms, and (iii) a query optimizer procedure;

b) responding to a user query which requires execution of a database function with respect to data stored at a first database, by executing said query optimizer procedure, said query optimizer procedure employing entries from said catalogue relating to database functions supported by both said first database and a second database, and establishing query plans for responding to said query, a first said query plan based upon an optimized execution thereof at said first database and a second said query plan based upon an optimized execution thereof at said second database;

c) choosing one of said query plans in accordance with a determined criteria; and d) executing said database management procedure, using a query plan chosen in step c) in response to said user query.

15. The method as recited in claim 14, wherein step b) employs entries from said catalogue relating to functions supported by said first database, and emulates a query optimization procedure for said first database approximately as said query optimization procedure is executed by said first database.

16. The method as recited in claim 14, wherein step c) employs execution cost as said determined criteria for choosing one of said query plans.

17. The method as recited in claim 14, wherein said second database is the database that acts as said system manager.

18. The method as recited in claim 17, wherein step d) employs one of said query plans, chosen in accord with said determined criteria, to access data from one of said plural databases and to present said data to a user processor as though said data had come from said database that acts as said system manager, whether or not said data came therefrom.

* * * * *